(12) United States Patent
Kunze et al.

(10) Patent No.: US 9,180,969 B2
(45) Date of Patent: Nov. 10, 2015

(54) AIRCRAFT SEAT ASSEMBLY FOR AIRCRAFT PASSENGERS HAVING RESTRICTED MOBILITY

(75) Inventors: Anja Kunze, Hamburg (DE); Florian Schmidt, Ahrensburg (DE); Oliver Doebertin, Hamburg (DE); Gordon Konieczny, Hamburg (DE); Uwe Schneider, Jork (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 13/481,423

(22) Filed: May 25, 2012

(65) Prior Publication Data

US 2012/0292953 A1     Nov. 22, 2012

Related U.S. Application Data

(63) Continuation of application No. PCT/EP2010/007194, filed on Nov. 26, 2010.

(60) Provisional application No. 61/264,723, filed on Nov. 27, 2009.

(30) Foreign Application Priority Data

Nov. 27, 2009   (DE) .................. 10 2009 056 188

(51) Int. Cl.
*B64D 11/06*     (2006.01)
*A61G 3/06*      (2006.01)
(Continued)

(52) U.S. Cl.
CPC  *B64D 11/06* (2013.01); *A61G 3/06* (2013.01); *A61G 5/00* (2013.01); *A61G 7/1025* (2013.01); *A61G 2220/10* (2013.01); *B64D 2011/0092* (2013.01); *Y02T 50/46* (2013.01)

(58) Field of Classification Search
CPC ........... B64D 11/06; A61G 3/06; A61G 5/00; A61G 7/025
USPC ......... 297/130, 248, 344.1, 217.3; 244/118.5, 244/118.6; 5/86.1, 86.1 HS; 280/250.1, 280/304.1
See application file for complete search history.

(56) References Cited

U.S. PATENT DOCUMENTS 3,865,427 A * 2/1975 Delany ............................ 296/68
4,170,368 A * 10/1979 Southward et al. ........ 280/250.1
(Continued)

FOREIGN PATENT DOCUMENTS

DE       3425205      1/1986
GB       2209310      5/1989
(Continued)

OTHER PUBLICATIONS

English language abstract for DE3425205 A1, Jan. 16, 1986.

*Primary Examiner* — Anthony D Barfield
(74) *Attorney, Agent, or Firm* — Taft Stettinius & Hollister LLP

(57) ABSTRACT

An aircraft seat assembly for aircraft passengers having restricted mobility comprises a seat base assembly that comprises a first carrier device and a first fastening means. The aircraft seat assembly further comprises a wheelchair sub-frame, a second carrier device and a second fastening means. The dimensions of the wheelchair sub-frame are adapted to the dimensions of aisles provided in the aircraft cabin. Finally, the aircraft seat assembly comprises a seat which comprises a fastening means that is complementary to the first fastening means of the seat base assembly and to the second fastening means of the wheelchair sub-frame.

2 Claims, 12 Drawing Sheets

Figure 1:
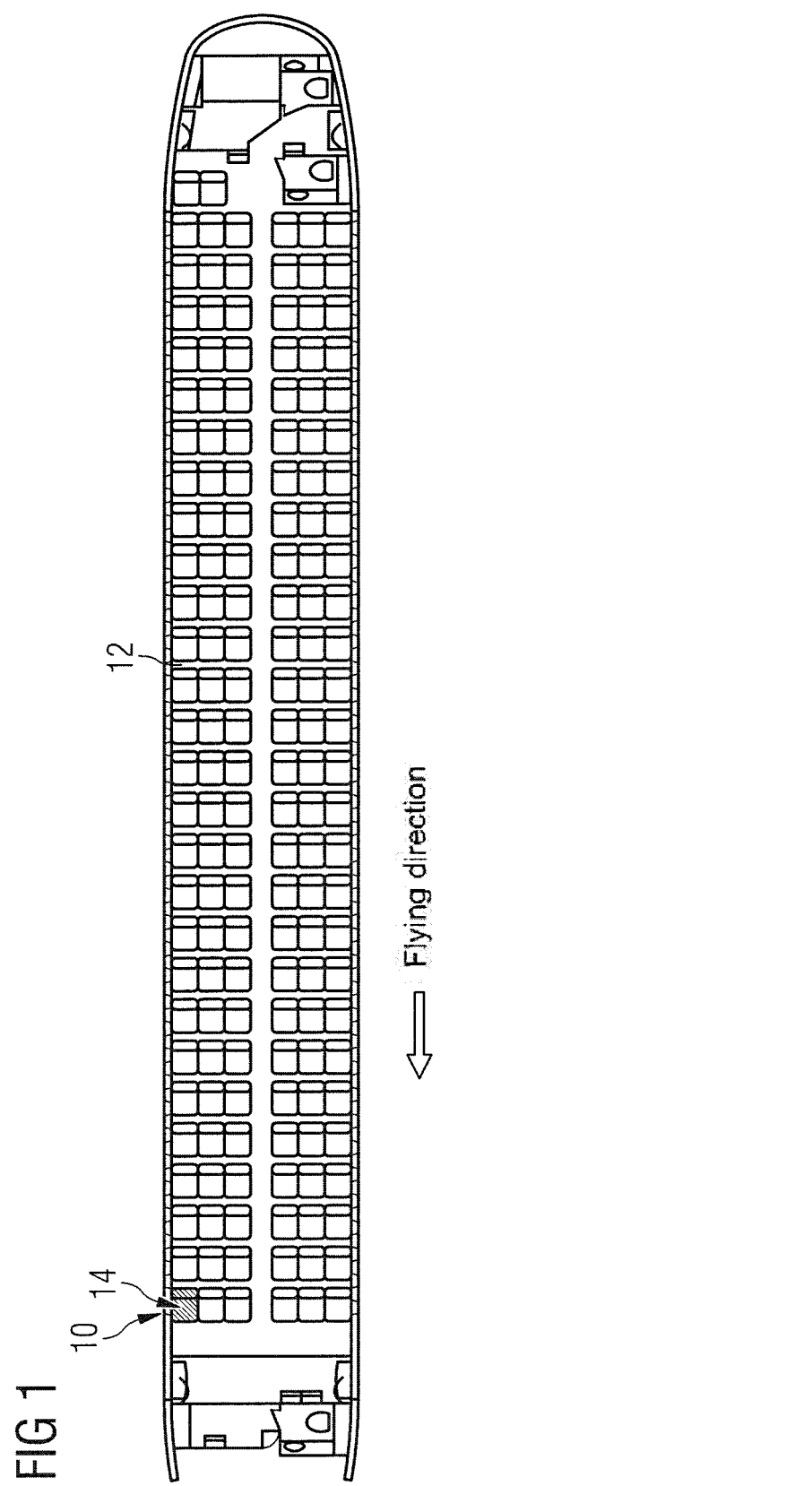

(51) Int. Cl.
*A61G 5/00* (2006.01)
*A61G 7/10* (2006.01)
*B64D 11/00* (2006.01)

(56) References Cited

U.S. PATENT DOCUMENTS

| | | | |
|---|---|---|---|
| 4,354,791 A | 10/1982 | Antonellis | |
| 4,728,119 A * | 3/1988 | Sigafoo | 280/657 |
| 4,987,620 A * | 1/1991 | Sharon | 5/600 |
| 5,769,360 A * | 6/1998 | Kerbis et al. | 244/118.6 |
| 5,791,731 A * | 8/1998 | Infanti | 297/217.3 |
| 6,098,946 A * | 8/2000 | Sechet et al. | 248/424 |
| 6,220,658 B1 * | 4/2001 | Lukawski et al. | 297/145 |
| 6,460,641 B1 * | 10/2002 | Kral | 180/24.02 |
| 6,839,918 B1 * | 1/2005 | Jensen | 4/480 |
| 7,137,161 B2 * | 11/2006 | Hempker et al. | 5/611 |
| 7,216,929 B2 * | 5/2007 | Lang et al. | 297/155 |
| 8,152,101 B2 * | 4/2012 | Law | 244/118.5 X |
| 2006/0097562 A1 * | 5/2006 | Hiruta et al. | 297/467 |
| 2008/0106060 A1 * | 5/2008 | Knopf | 280/250.1 |
| 2011/0304189 A1 * | 12/2011 | Wahls | 297/367 R |

FOREIGN PATENT DOCUMENTS

| | | |
|---|---|---|
| IE | 960422 A2 | 12/1996 |
| WO | WO 2007/060488 | 5/2007 |

* cited by examiner

FIG 7
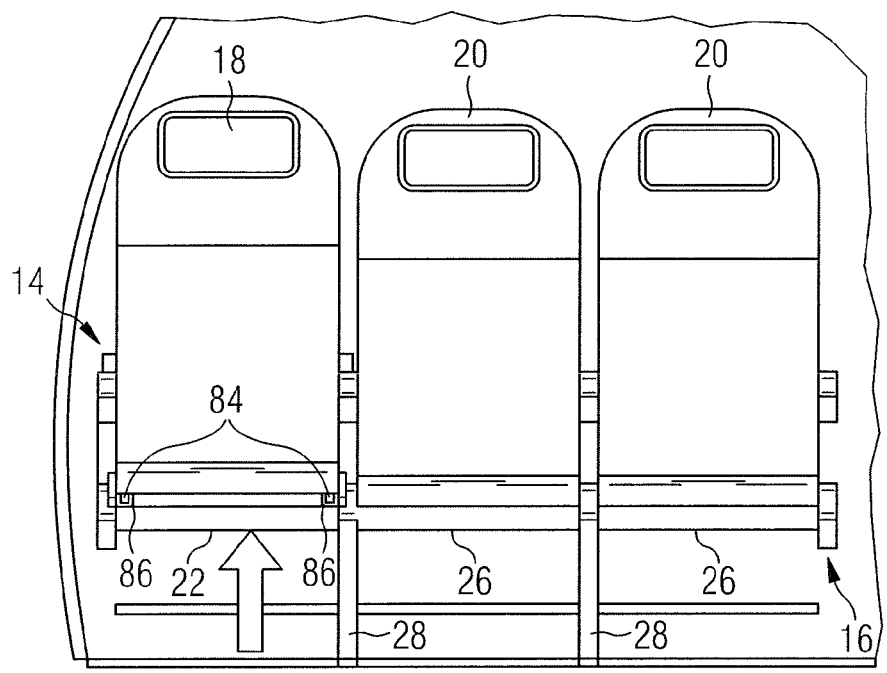
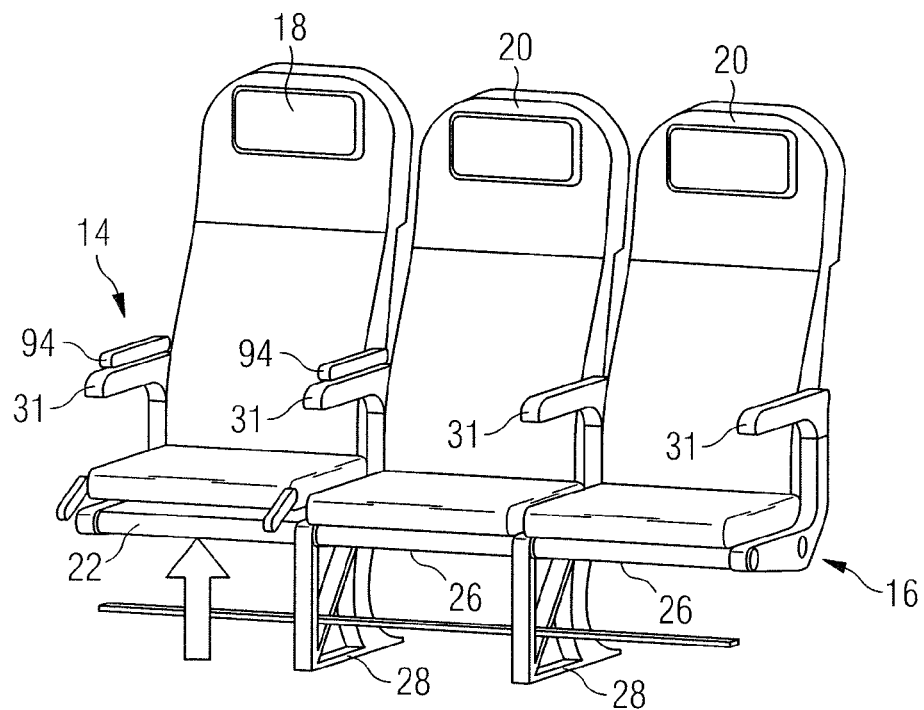

AIRCRAFT SEAT ASSEMBLY FOR AIRCRAFT PASSENGERS HAVING RESTRICTED MOBILITY

The present application is a continuation application of International Patent Application No. PCT/EP2010/007194, filed Nov. 26, 2010, which claims the benefit of U.S. Provisional Application No. 61/264,723, filed Nov. 27, 2009 and claims priority to German Patent Application No. 10 2009 056 188.9, filed Nov. 27, 2009, each of which is incorporated herein by reference.

The invention relates to an aircraft seat assembly for aircraft passengers having restricted mobility.

For people having restricted mobility, who use a wheelchair to get around, travelling in modern commercial aircraft involves a great deal of inconvenience. At some airports it is not even possible for a wheelchair-dependent person to pass through security checks in his own wheelchair. Instead, the wheelchair-dependent person has to transfer to an all-plastic wheelchair that has been specially developed for use at the airport and does not trigger an alarm when it passes through the metal detectors of the security checks. The wheelchair-dependent person however, even at airports that allow him to pass through security checks in his own wheelchair, at the latest upon reaching the gate has to leave his wheelchair because the aisles in an aircraft cabin are not wide enough for a standard wheelchair. The wheelchair-dependent person has to transfer to an aircraft wheelchair, the width of which is adapted to the aisle width of the aircraft cabin.

With the aid of the aircraft wheelchair the wheelchair-dependent person is taken into the aircraft cabin usually with the help of the airport support staff, with it then possibly being necessary, if the aircraft is not parked directly adjacent to the airport building and accessible via a telescopic gangway, to bring the aircraft wheelchair with the wheelchair-dependent person into the aircraft via a flight of stairs. This means that the aircraft wheelchair containing the wheelchair-dependent person has to be either carried or conveyed by means of a lifting device up the stairs. Finally, in the aircraft cabin the wheelchair-dependent person is moved to his seat row and lifted onto his seat. It is self-evident that disembarkation of the wheelchair-dependent person from the aircraft entails the same steps in reverse order.

The seat allocation for physically disabled aircraft passengers is effected with due regard to safety rules regarding a possible evacuation of the aircraft. Aircraft seats that are to be occupied by passengers with restricted mobility have fold-up armrests and are marked with special symbols. Furthermore, these aircraft seats have to be situated next to the window in order in the event of an emergency to guarantee as smooth an evacuation of the aircraft as possible. Otherwise, however, aircraft seats that are to be occupied by passengers with restricted mobility correspond to conventional aircraft seats.

Both for aircraft passengers with restricted mobility and for the airport- and airline support staff the previously described, currently followed procedure leads to a great many problems and drawbacks. For the wheelchair-dependent aircraft passenger the frequent transfers from his own wheelchair to the airport wheelchair, from the airport wheelchair to the aircraft wheelchair and finally from the aircraft wheelchair to the aircraft seat situated next to the window, i.e. at the end of a seat row remote from the aisle, are uncomfortable and involve frequent physical contact by strangers that occasionally may also be regarded as an invasion of intimate personal space. For the support staff, on the other hand, looking after a wheelchair-dependent aircraft passenger subjects them to high physical and emotional stress. Furthermore, conveying a wheelchair-dependent person via a flight of stairs in particular poses a not inconsiderable risk of injury both for the wheelchair-dependent person and for the support staff. Further drawbacks are a lengthening of the total embarkation- and disembarkation times due to the presence of a wheelchair-dependent person among the aircraft passengers as well as the need to carry an aircraft wheelchair on board the aircraft, which leads to a weight increase and to additional space being required for storing the aircraft wheelchair during the flight. Finally, during the flight an aircraft passenger with restricted mobility can leave his seat next to the window only with great difficulty and the manual assistance of the crew on board the aircraft.

The underlying object of the invention is to provide an aircraft seat assembly that enables greater comfort for aircraft passengers having restricted mobility and a reduction of the physical and emotional stress experienced by airport- and airline support staff when looking after aircraft passengers having restricted mobility.

This object is achieved by an aircraft seat assembly having the features of claim 1. An aircraft seat assembly according to the invention for aircraft passengers having restricted mobility comprises a seat base assembly that is mountable in an aircraft cabin. The seat base assembly is provided with a first carrier device and a first fastening means for detachably fastening a seat to the first carrier device. To enable mounting of the seat base assembly in an aircraft cabin, the seat base assembly may for example comprise at least one pedestal that is preferably devised to interact with a mounting rail provided in a floor of the aircraft cabin in order to fix the pedestal and hence the seat base assembly to the floor of the aircraft cabin.

The seat base assembly of the aircraft seat assembly according to the invention may be configured in the form of a separate unit that is associated exclusively with the aircraft seat assembly according to the invention. However, the seat base assembly may alternatively be part of an aircraft seat bench that extends for example over an aircraft seat row. The seat base assembly may further be provided with an armrest or two armrests, wherein the armrest(s) is (are) preferably pivotable about an axis so that the armrest(s) is (are) pivotable between a folded-up and a folded-down position. The first carrier device of the seat base assembly may be for example of a substantially plate-shaped construction. Alternatively, the first carrier device may comprise one or more carrier struts, wherein a plurality of carrier struts may be disposed for example substantially parallel to one another. The carrier strut(s) may extend substantially at right angles to a longitudinal axis of the aircraft cabin and form for example the first fastening means. The first carrier device in the mounted state of the seat base assembly in an aircraft cabin preferably extends substantially parallel to the floor of the aircraft cabin.

The aircraft seat assembly according to the invention preferably further comprises a wheelchair sub-frame which comprises a plurality of wheels, a second carrier device and a second fastening means for detachably fastening a seat to the second carrier device. The dimensions of the wheelchair sub-frame are adapted to the dimensions of aisles provided in the aircraft cabin, i.e. the wheelchair sub-frame is dimensioned in such a way that the wheelchair sub-frame with a seat fastened thereto may be moved through the aisles provided in the aircraft cabin.

The wheelchair sub-frame is preferably designed as lightweight as possible and may be made for example of plastics material or a light metal, such as for example aluminium. A particularly lightweight design of the wheelchair sub-frame is possible if the second carrier device of the wheelchair sub-frame is formed by framework elements, which in turn are formed from a plurality of struts. For example, the second carrier device of the wheelchair sub-frame may comprise a first framework element, a second framework element lying opposite the first framework element, and at least one connecting strut that connects the two framework elements to one another. The framework elements in turn may be formed for example by struts that intersect in an X-shaped manner. Alternatively, a second carrier device comprising a single support column that carries the second fastening means is conceivable. The second fastening means of the wheelchair sub-frame may comprise for example a rotatable adapter plate that is mounted on the second carrier device.

Finally the aircraft seat assembly according to the invention comprises a seat, which comprises a fastening means that is complementary to the first fastening means of the seat base assembly and to the second fastening means of the wheelchair sub-frame, so that the seat is detachably fastened both to the seat base assembly and to the wheelchair sub-frame. The fastening means of the seat may be of a multipart design, so that a first part may interact with the first fastening means of the seat base assembly and a second part may interact with the second fastening means of the wheelchair sub-frame. For example, a first part of the fastening means of the seat may be provided for interacting with a fastening means of the seat base assembly that comprises two carrier struts, and a second part of the fastening means of the seat may be provided for interacting with a second fastening means of the wheelchair sub-frame that comprises a rotatable adapter plate. The first part of the fastening means of the seat may then comprise for example two bearing elements that engage around the two carrier struts when the seat is fastened to the seat base assembly. The second part of the fastening means of the seat, on the other hand, may comprise a retaining plate, around which the adapter plate may engage.

However, the first fastening means of the seat base assembly and the second fastening means of the wheelchair sub-frame may alternatively be of a such a similar and/or identical construction that the same fastening means and/or the same fastening element of the fastening means of the seat may interact selectively with the first fastening means of the seat base assembly or with the second fastening means of the wheelchair sub-frame. Such a configuration of the fastening means of the seat base assembly, the wheelchair sub-frame and the seat enables a particularly simple and lightweight design in particular of the fastening means of the seat.

To enable a wheelchair-dependent aircraft passenger to enter an aircraft, the seat of the aircraft seat assembly according to the invention may be fastened to the wheelchair sub-frame. The wheelchair-dependent passenger may then, immediately after his arrival at the airport, be placed on the seat fastened to the wheelchair sub-frame and taken by the airport support staff through security checks to the gate. The wheelchair-dependent passenger may then be taken directly into the aircraft cabin without there being any need to transfer the passenger to an aircraft wheelchair. In the aircraft cabin the wheelchair-dependent passenger is then taken to his seat row and the wheelchair sub-frame with the seat fastened thereto is positioned in such a way relative to the seat base assembly that the seat may be detached from the wheelchair sub-frame, positioned on the seat base assembly and finally fastened detachably to the seat base assembly. For this step there is also no need for the wheelchair-dependent passenger to leave the seat.

Disembarkation of the wheelchair-dependent passenger from the aircraft may be effected in a corresponding manner, i.e. in a first step the fastening of the seat to the seat base assembly is released and the seat is positioned and fastened instead on the wheelchair sub-frame, which has been placed accordingly, i.e. for example in front of the seat base assembly or under the first carrier device of the seat base assembly. The wheelchair-dependent aircraft passenger may then be moved through the aisles of the aircraft cabin and taken from the aircraft to the gate. In the airport building the passenger may then finally transfer back to his own wheelchair. It is self-evident that the wheelchair sub-frame may also be used during the flight to convey the wheelchair-dependent passenger from his seat to another location in the aircraft passenger cabin, for example to the wash rooms.

The aircraft seat assembly according to the invention makes it possible to limit to a minimum the transfers that are entailed by the currently followed procedure. It is moreover possible to dispense with lifting a wheelchair-dependent aircraft passenger from an aircraft wheelchair across a complete seat row to his seat next to the window. Thus, with the aid of the aircraft seat assembly according to the invention flying trips may be made much more comfortable and pleasant for persons having restricted mobility. Furthermore, by virtue of the aircraft seat assembly according to the invention the physical and emotional stress to which the airport- and airline support staff are subject when looking after a wheelchair-dependent aircraft passenger is markedly reduced. The risk of injury for the wheelchair-dependent aircraft passenger and the support staff may also be lowered by reducing the number of necessary transfers. Consequently, the aircraft seat assembly according to the invention may contribute towards an enhancement of the image of an airline as an airline particularly suitable for carrying passengers with restricted mobility.

Shorter total embarkation- and disembarkation times and hence a faster turnaround time of the aircraft at the gate as well as a reduced weight of the overall system, because instead of a complete aircraft wheelchair only the wheelchair sub-frame has to be carried on board the aircraft, may be regarded as further advantages of the aircraft seat assembly according to the invention. Finally, the wheelchair sub-frame takes up less room than a complete aircraft wheelchair and is therefore easier to stow in the aircraft passenger cabin during the flight.

In a first embodiment of the seat assembly according to the invention the seat base assembly comprises a first guide device, the wheelchair sub-frame comprises a second guide device, and the seat comprises a guide device that is complementary to the first guide device of the seat base assembly and to the second guide device of the wheelchair sub-frame. The seat is therefore movable in a guided manner both relative to the seat base assembly and relative to the wheelchair sub-frame. The guide device of the seat may be of a multipart construction, so that a first part of the guide device of the seat may interact with the first guide device of the seat base assembly and a second part of the guide device of the seat may interact with the second guide device of the wheelchair sub-frame. A constructionally particularly simple and lightweight configuration of the overall guide device system is however possible if the first guide device of the seat base assembly and the second guide device of the wheelchair sub-frame are of a such similar and/or identical construction that the guide device of the seat may interact in an identical manner with the first guide device of the seat base assembly and with the second guide device of the wheelchair sub-frame.

The first guide device of the seat base assembly may be disposed in the region of a portion of the first carrier device that is provided for receiving the seat. If the first carrier device is of a plate-shaped construction, the first guide device may be mounted for example on a surface of the first carrier device that is provided for supporting the seat. In a similar fashion the second guide device of the wheelchair sub-frame may be disposed in the region of a portion of the second carrier device that is provided for receiving the seat. For example, the second guide device of the wheelchair sub-frame may be supported on corresponding framework elements that form the second carrier device. The guide device of the seat is mounted preferably in the region of an underside of a seating surface of the seat that is provided for interacting with the seat base assembly and/or the wheelchair sub-frame.

The first guide device of the seat base assembly may comprise at least one rail element, which is adapted to interact with a complementary rail element of the guide device of the seat in order to enable a guided movement of the seat relative to the seat base assembly. Alternatively or in addition thereto, the second guide device of the wheelchair sub-frame may also comprise at least one rail element, which is devised to interact with a complementary rail element of the guide device of the seat in order to enable a guided movement of the seat relative to the seat base assembly of the wheelchair sub-frame.

The rail element of the first guide device of the seat base assembly and/or the rail element of the second guide device of the wheelchair sub-frame may be configured in the form of a receiving rail, in which the rail element of the guide device of the seat may be displaceably received. Alternatively or in addition thereto, the guide device of the seat may also be provided with a rail element configured in the form of a receiving rail, which is shaped and dimensioned in such a way that a correspondingly shaped complementary rail element of the first guide device of the seat base assembly and/or of the second guide device of the wheelchair sub-frame may be displaceably received therein.

In principle the first guide device of the seat base assembly and/or the second guide device of the wheelchair sub-frame may comprise only one rail element, which is adapted to interact with only one complementary rail element of the guide device of the seat. Where desired or necessary, the first guide device of the seat base assembly and/or the second guide device of the wheelchair sub-frame as well as the guide device of the seat may however also comprise a plurality of rail elements. A particularly stable positioning and guiding of the seat on the seat base assembly and/or the wheelchair sub-frame is possible if the first guide device of the seat base assembly and/or the second guide device of the wheelchair sub-frame comprise(s) two rail elements that extend substantially parallel to one another. The guide device of the seat is then preferably likewise provided with two rail elements, which are disposed substantially parallel to one another and are of a complementary construction to the rail elements of the first guide device of the seat base assembly and/or of the second guide device of the wheelchair sub-frame.

The rail elements of the first guide device of the seat base assembly and/or of the second guide device of the wheelchair sub-frame extend preferably parallel to a seating surface of a seat fastened to the seat base assembly and/or the wheelchair sub-frame and in a particularly preferred manner substantially parallel to side edges of the seating surface of the seat. The rail elements of the guide device of the seat likewise extend preferably parallel to a seating surface of the seat and in a particularly preferred manner substantially parallel to side edges of the seating surface of the seat. A height of the wheelchair sub-frame is moreover preferably adjusted to a height of the seat base assembly, i.e. the first carrier device of the seat base assembly and the second carrier device of the wheelchair sub-frame enable the seat to be disposed at approximately the same height above the floor on the seat base assembly and/or the wheelchair sub-frame. Given such a configuration of the seat assembly according to the invention, in a manner that is comfortable for the wheelchair-dependent aircraft passenger the seat may be pushed by means of a substantially linear movement of the seat in a direction parallel to the seating surface of the seat from the wheelchair sub-frame onto the seat base assembly and/or from the seat base assembly onto the wheelchair sub-frame.

The second carrier device of the wheelchair sub-frame may comprise a lifting mechanism for adjusting the height of the second carrier device. The lifting mechanism may comprise a hydraulic, pneumatic, electric or other suitable drive. Furthermore, the seat base assembly and the wheelchair sub-frame are preferably designed in such a way that the wheelchair sub-frame may be positioned under the first carrier device of the seat base assembly. Given such a configuration of the seat base assembly and the wheelchair sub-frame, the wheelchair sub-frame may in a first step be positioned under the carrier device of the seat base assembly that carries the seat. The second carrier device may then be lifted by means of the lifting mechanism until the second fastening means of the wheelchair sub-frame comes into engagement with the fastening means of the seat and the seat may be detached from the seat base assembly.

The first fastening means of the seat base assembly preferably comprises a locking device. In addition or alternatively thereto the second fastening means of the wheelchair sub-frame may comprise a locking device. The locking device(s) of the first fastening means of the seat base assembly and/or of the second fastening means of the wheelchair sub-frame is (are) preferably adapted to interact with a complementary locking device of the fastening means of the seat in order to fasten the seat detachably to the seat base assembly or the wheelchair sub-frame. The locking device of the seat may be of a multipart construction, so that a first part of the locking device of the seat may interact with the locking device of the seat base assembly and a second part of the locking device of the seat may interact with the locking device of the wheelchair sub-frame. A constructionally particularly simple and lightweight configuration of the overall system is however possible if the locking device of the seat base assembly and the locking device of the wheelchair sub-frame are of such a similar or identical construction that the locking device of the seat may interact in an identical manner with the locking device of the seat base assembly and with the locking device of the wheelchair sub-frame.

The locking device of the first fastening means of the seat base assembly and/or of the second fastening means of the wheelchair sub-frame may comprise a locking element that is movable between a locking position and an unlocking position. The locking device of the fastening means of the seat may further comprise a receiving device for receiving the locking element in the locking position thereof. Alternatively or in addition thereto the locking device of the fastening means of the seat may comprise a locking element that is movable between a locking position and an unlocking position. The locking device of the first fastening means of the seat base assembly and/or of the second fastening means of the wheelchair sub-frame then preferably comprise(s) a receiving device for receiving the locking element in the locking position thereof. Such an arrangement enables a particularly easy and comfortable fastening of the seat to the seat base assembly or the wheelchair sub-frame.

The locking device(s) of the first fastening means of the seat base assembly, the second fastening means of the wheelchair sub-frame and/or the fastening means of the seat may comprise only one locking element. However, the locking device(s) may alternatively be provided with a plurality of locking elements which, if need be, are movable only jointly or independently of one another between a locking position and an unlocking position. The locking device(s) is (are) preferably provided with an easily accessible actuating element, for example a lever or the like, for moving the locking element(s) easily between their locking position and their unlocking position.

The locking device(s) of the first fastening means of the seat base assembly, the second fastening means of the wheelchair sub-frame and/or the fastening means of the seat preferably comprise(s) a locking element that is spring-loaded into its locking position. Given such a configuration of the locking device, the locking element merely has to be actuated to move it from its locking position into its unlocking position. As soon as the seat is in a suitable position on the seat base assembly and/or the wheelchair sub-frame and hence the locking element of the locking device is positioned in such a way that it may interact with a complementary receiving device, the locking element is moved by the spring loading force automatically into its locking position, for example into engagement with the receiving device. The moving of the locking element from its locking position into its unlocking position may be effected manually. However, where desired, a corresponding mechanism, such as for example an electric motor or the like, may be provided for this purpose.

The locking element may be configured for example in the form of a bolt, which is adapted to interact with a receiving device configured in the form of a recess. The receiving device configured in the form of a recess may be formed for example in a rail element preferably configured in the form of a receiving rail of a guide device. The locking element may then be integrated in a constructionally simple manner into a rail element configured in a complementary manner to the receiving rail.

In a preferred embodiment the aircraft seat assembly according to the invention comprises an electrical or electronic system that is connectable to a communications system of the aircraft. The electrical or electronic system may be for example an entertainment system having a monitor that is integrated into a rear side of a backrest of a seat. To enable the electrical or electronic system integrated into the seat to be connected to the electrical supply system of the aircraft, the seat preferably further comprises an electrical connection element. The electrical connection element of the seat is preferably adapted to interact with a complementary electrical connection element of the seat base assembly when the seat is positioned on the seat base assembly.

For example, the electrical connection element of the seat and the complementary electrical connection element of the seat base assembly may be configured in the form of plug-in contacts that come into engagement with one another when the seat is brought into its fastening position on the seat base assembly and establish an electrical contact when the seat has reached its fastening position of the seat base assembly. However, particularly convenient connecting of the electrical or electronic system integrated into the seat to the electrical supply system of the aircraft is possible if the electrical connection element of the seat and the complementary electrical connection element of the seat base assembly comprise in each case touch-sensitive contact elements that establish an electrical contact as soon as they touch one another, for example in the region of correspondingly designed contact surfaces.

The seat preferably comprises a stop element, which is adapted to interact with a complementary stop element of the seat base assembly when the seat is disposed on the seat base assembly in a position, in which the seat is detachably fastenable to the seat base assembly. The stop element of the seat that is provided for interacting with the complementary stop element of the seat base assembly may be integrated for example into a rail element of the guide device of the seat and disposed in the region of a rear edge of the rail element, i.e. an edge disposed in the region of the backrest of the seat. In a similar fashion the complementary stop element of the seat base assembly may also be integrated into a rail element of the first guide device of the seat base assembly. During the positioning of the seat on the seat base assembly by pushing the seat onto the seat base assembly the interaction of the stop elements reliably prevents the seat from being moved, backrest first, beyond a desired fastening position.

The electrical connection element of the seat is preferably disposed in the region of a surface of the stop element of the seat that interacts with a surface of the complementary stop element of the seat base assembly that is provided with the complementary electrical connection element of the seat base assembly when the seat is disposed on the seat base assembly in a position, in which the seat is detachably fastenable to the seat base assembly. By virtue of such a positioning of the electrical connection element it is ensured that an electrical connection of an electrical or electronic system integrated into the seat is effected automatically once the seat has reached its fastening position on the seat base assembly.

In order also to limit a displacement of the seat relative to the wheelchair sub-frame, the seat preferably further comprises a stop element, which is adapted to interact with a complementary stop element of the wheelchair sub-frame when the seat is disposed on the wheelchair sub-frame in a position, in which the seat is detachably fastenable to the wheelchair sub-frame. The stop element of the seat that is provided for interacting with the complementary stop element of the wheelchair sub-frame may for example be integrated into a rail element of the guide device of the seat and be disposed in the region of a front edge of the rail element, i.e. an edge remote from the backrest of the seat. In a similar fashion the complementary stop element of the wheelchair sub-frame may also be integrated into a rail element of the second guide device of the wheelchair sub-frame. The interaction of the stop elements reliably prevents the seat during its positioning on the wheelchair sub-frame by pushing the seat onto the wheelchair sub-frame from being moved, with its front edge remote from the backrest first, beyond a desired fastening position.

The second carrier device of the wheelchair sub-frame may be of a collapsible construction. For example, intersecting struts of the second carrier device may be provided in the region of their point of intersection with corresponding articulated joints that enable the second carrier device to collapse. The wheelchair sub-frame may then be stowed in a particularly space-saving manner in the aircraft cabin, for example in an overhead luggage compartment. The wheelchair sub-frame may further comprise a footrest. The footrest is preferably fastened to the second carrier device of the wheelchair sub-frame so as to be pivotable about an axis so that, when the second carrier device of the wheelchair sub-frame is collapsed, the footrest may likewise be positioned in a space-saving manner.

The wheelchair sub-frame of the aircraft seat assembly according to the invention may be provided with wheels, which are rotatable not only about a wheel axis but also about an axis perpendicular to the wheel axis. The wheelchair sub-frame may therefore in a particularly convenient manner be shifted in various directions, thereby facilitating the travel of the wheelchair sub-frame in the narrow aisles of an aircraft passenger cabin. A wheelchair sub-frame configured with small wheels that are rotatable about two axes does not however allow a wheelchair-dependent person to move about independently with the aid of the wheelchair sub-frame. Where desired, the wheelchair sub-frame may therefore also be equipped with large wheels that allow a wheelchair-dependent person to move about independently. However, this makes the wheelchair sub-frame bulkier, heavier and difficult to manoeuvre in a narrow aircraft passenger cabin. It is therefore also conceivable to equip the wheelchair sub-frame with an automatic drive, for example an electric drive, that allows a wheelchair-dependent person to move about independently.

The seat of the aircraft seat assembly according to the invention preferably comprises aircraft seat upholstery, the shape and colour of which is preferably adapted to the shape and colour of the other aircraft seat upholstery fitted in the aircraft passenger cabin. The seat may further be provided with armrests, which are pivotable about an axis and enable a wheelchair-dependent aircraft passenger to support his arms once the seat has been placed on the wheelchair sub-frame. The pivotable armrests mounted on the seat are however preferably positioned in such a way that they do not interact in an obstructive manner with armrests of the seat base assembly once the seat has been positioned on the seat base assembly. For example, the armrests may be mounted in such a way on the seat that in the folded-down state they are disposed on or above the armrests of the seat base assembly once the seat has been fastened to the seat base assembly.

The seat of the aircraft seat assembly may further comprise a safety belt. In order to increase the safety of the wheelchair-dependent aircraft passenger the safety belt may be configured in the form of a four-point belt or comprise an additional four-point belt. A table that may be swivelled between a folded-in and a folded-out position may moreover be integrated into the seat. The table is mounted preferably in the region of a rear side of the backrest of the seat. Finally the seat may comprise at least one handle, which enables the seat positioned on the wheelchair sub-frame to be shifted with the aid of the wheelchair sub-frame. Preferably two handles extend substantially at right angles to the backrest of the seat from a rear side of the backrest of the seat. The handles are preferably pivotable between a folded-in and a folded-out position, so that the handles may be folded in once the seat has been fastened to the seat base assembly. This prevents passengers in an adjacent seat row from being adversely affected by the handles. Finally, the seat may be provided with at least one leg support, wherein preferably two leg supports extend substantially parallel to one another from a front edge of the seating surface of the seat that is remote from the seat backrest. The leg supports are preferably fastened pivotably to the seat, thereby enabling the leg supports to be folded in when not required.

The aircraft seat assembly may further be equipped with an electrical or electronic system for controlling the wheelchair sub-frame. Such a control system preferably comprises an operator control unit that is connected to the seat of the aircraft seat assembly. The operator control unit may be disposed for example in the region of an armrest of the seat so as to be easily accessible to a passenger with restricted mobility who is sitting on the seat. The system may further comprise a drive unit of the wheelchair sub-frame that is controllable by means of corresponding signals of the operator control unit. Between the operator control unit and the drive unit of the wheelchair sub-frame there is preferably a wireless data transmission link.

A passenger with restricted mobility may control the movement of the wheelchair sub-frame through the cabin in a desired manner by means of the operator control unit. Once the seat of the aircraft seat assembly has been fastened to the wheelchair sub-frame and the passenger is sitting on the seat, the aircraft seat assembly may therefore be operated like an electric wheelchair by the passenger. What is more, when the seat of the aircraft seat assembly is fastened to the seat base assembly, the passenger may request the wheelchair sub-frame by remote control. The mobility of the passenger during the flight is therefore markedly improved.

The system for controlling the wheelchair sub-frame is preferably adapted, during control of the controllable drive unit of the wheelchair sub-frame by means of the operator control unit connected to the seat, additionally to take account of an enabling signal and/or a control signal of an aircraft communications system. For example, the system for controlling the wheelchair sub-frame may be devised to allow an activation of the drive unit of the wheelchair sub-frame by means of the operator control unit only if a corresponding enabling of this function of the aircraft seat assembly has been effected. The enabling may be effected for example by means of manual signal input by the cabin crew or by means of an automatically generated signal of the aircraft communications system. In a memory, which may be associated for example with the aircraft communications system, permitted routes that the wheelchair sub-frame is allowed to travel in the aircraft cabin may further be stored. Finally, the control functions of the system for controlling the wheelchair sub-frame may be subject to temporary restrictions, for example in dependence upon the flying operational state of the aircraft, i.e. for example movement of the wheelchair sub-frame through the aircraft cabin may be suspended during take-off, landing, serving times and in the event of turbulence.

The system for controlling the wheelchair sub-frame preferably comprises a location system for determining the position of the wheelchair sub-frame in the aircraft cabin. The location system may comprise for example an ultrasonic location system comprising at least two ultrasonic sensors disposed in the aircraft cabin. In addition or alternatively thereto, the location system may be provided with an optical bar-code recognition system comprising corresponding pictographs provided in the underfloor area of the cabin. Finally, the wheelchair sub-frame may comprise a differential with a rotation sensor, which during a rotation of the wheels is at rest and therefore measures only the route actually travelled by the wheelchair sub-frame. The differential may moreover determine an angular deflection of the wheels from any different rotational speed of the individual wheels of the wheelchair sub-frame.

The system for controlling the wheelchair sub-frame may further comprise a system for detecting obstacles. An obstacle detection system is advantageous particularly when the wheelchair sub-frame is moving through the aircraft cabin under the control of the operator control unit. The obstacle detection system may for example comprise a resistance meter positioned in a wheel hub of the wheelchair sub-frame. The control system may then be adapted to stop the movement of the wheelchair sub-frame in real time if the wheelchair sub-frame encounters an obstacle as it moves through the aircraft cabin. The control system may further be adapted to resume the travel of the wheelchair sub-frame after a predetermined interval of for example several seconds. If the obstacle is then still there, the control system may be adapted to emit a corresponding signal or alert the cabin crew via the aircraft communications system.

The wheelchair sub-frame is preferably equipped with a device for emitting an audible and/or visual warning signal. The warning signal may be emitted for example whenever the wheelchair sub-frame is moving through the aircraft cabin.

The aircraft seat assembly may further comprise a charging station, which is adapted to be connected to the wheelchair sub-frame in order to charge an energy storage unit of the wheelchair sub-frame while the wheelchair sub-frame is not in use. The charging station may be provided for example for installation in the region of the galleys of the aircraft. In a meaningful manner the charging station is positioned and configured in such a way that it also enables secure retention of the wheelchair sub-frame during take-off and during landing of the aircraft.

Figure 2:
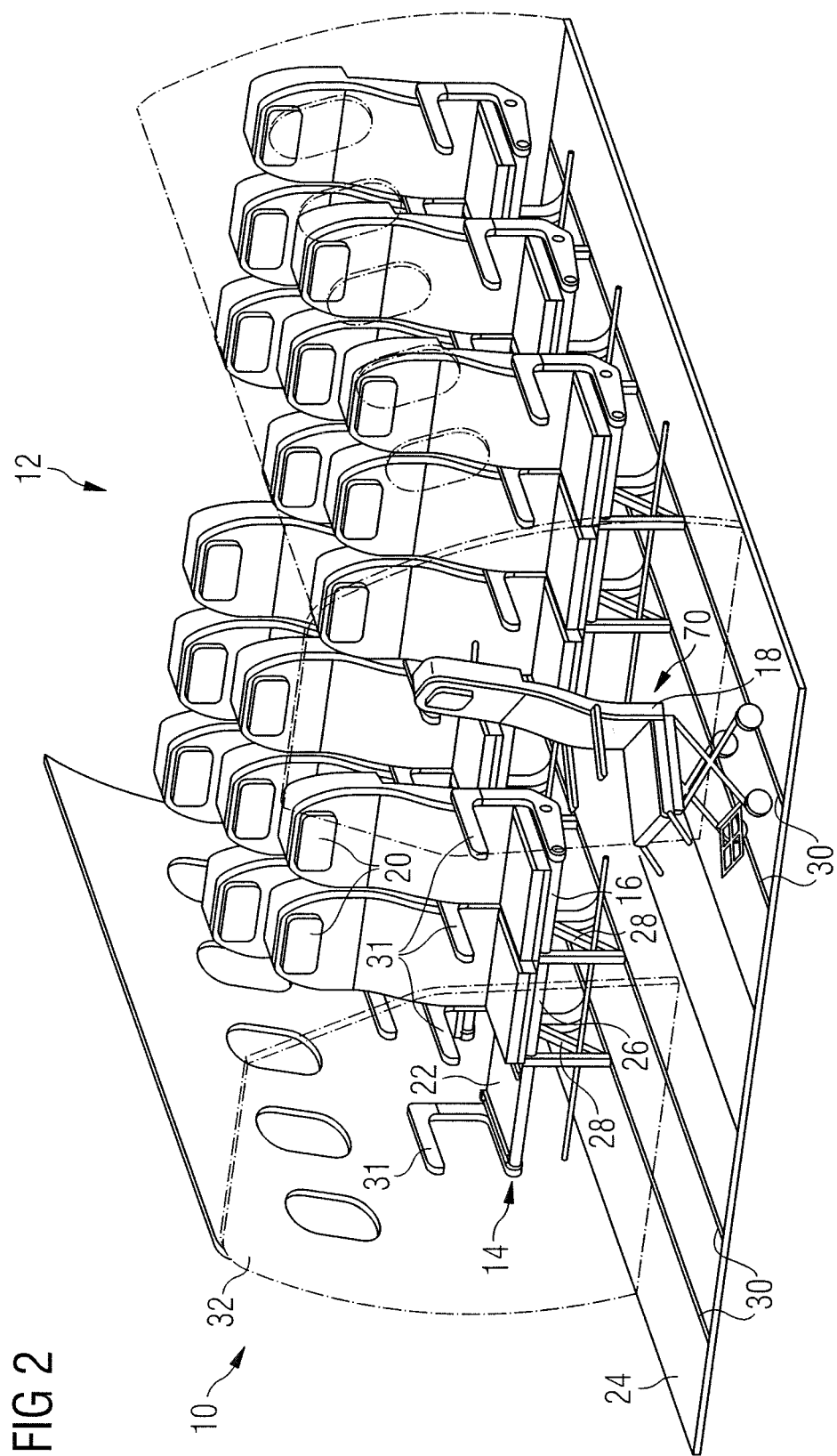
Figure 3:
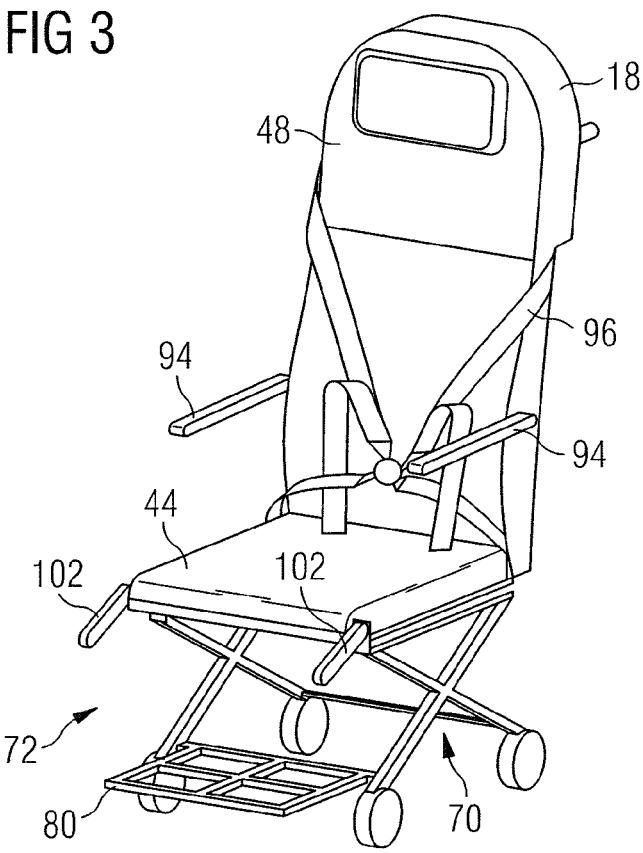
Figure 4:
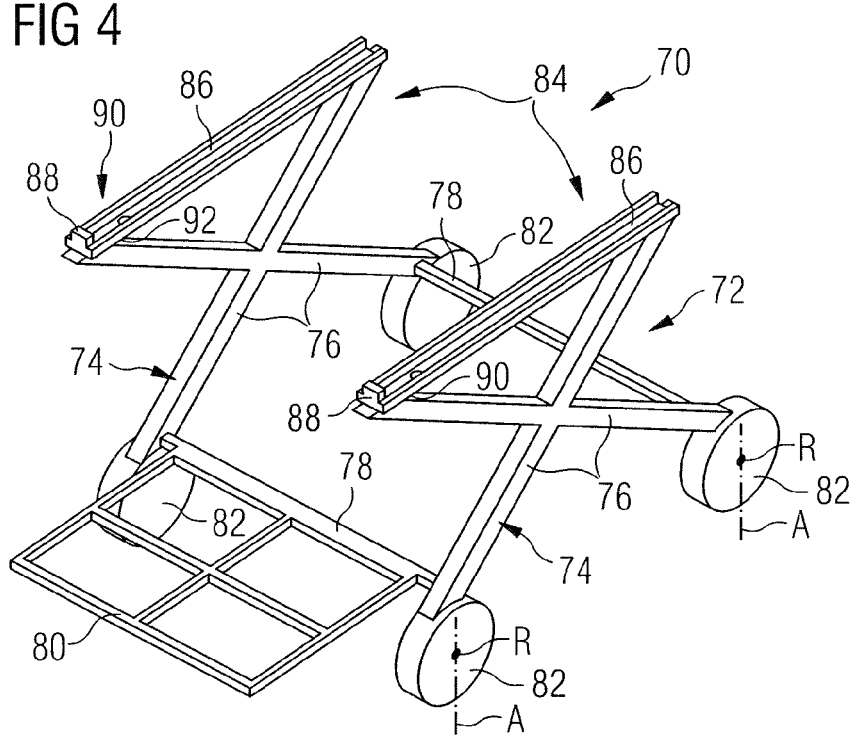
Figure 5:
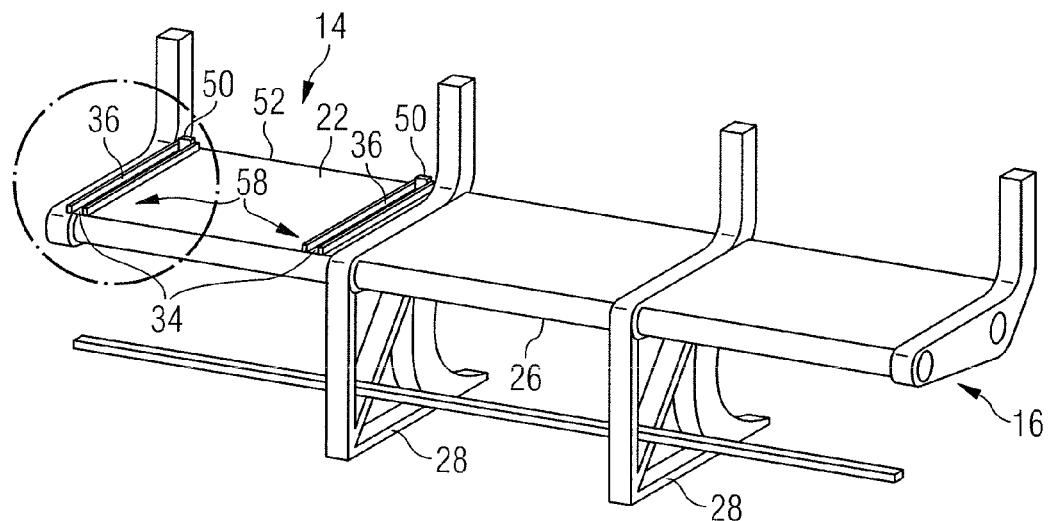
Figure 6:
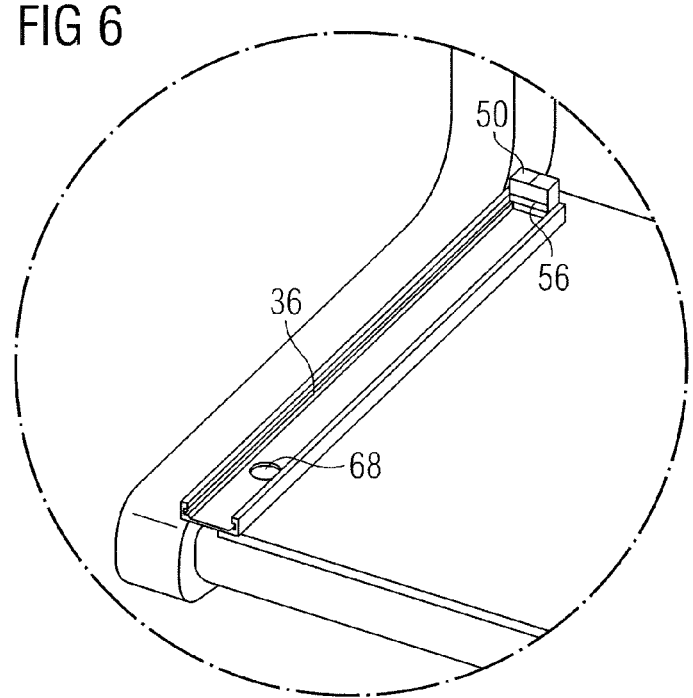
Figure 8:
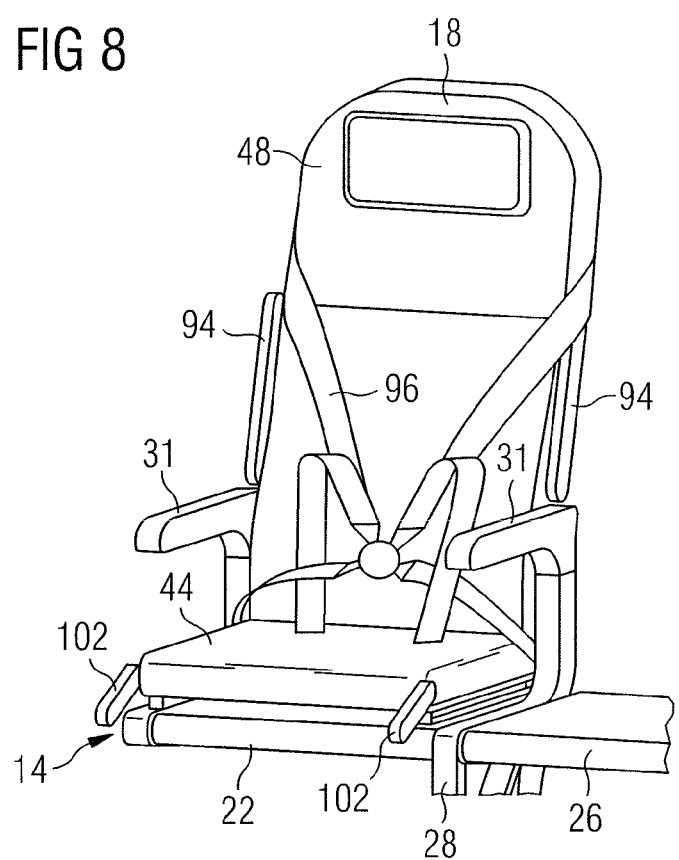
Figure 9:
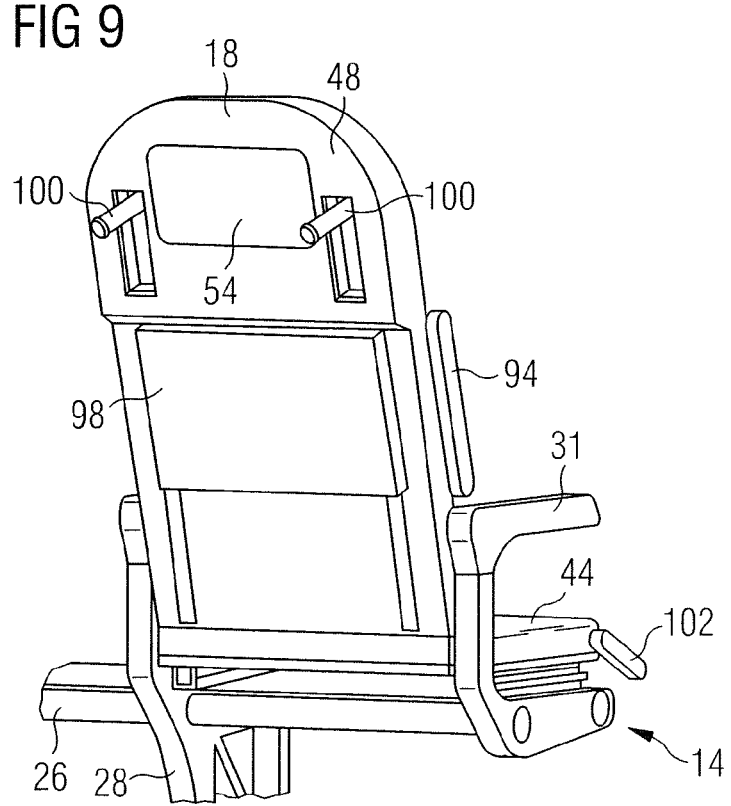
Figure 10:
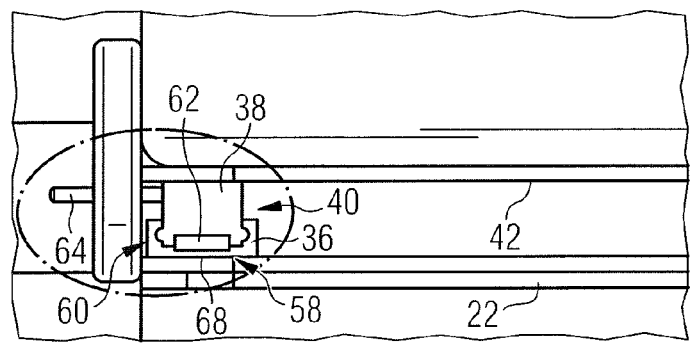
Figure 11:
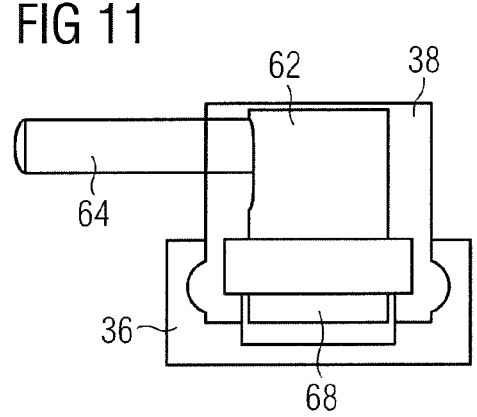
Figure 12:
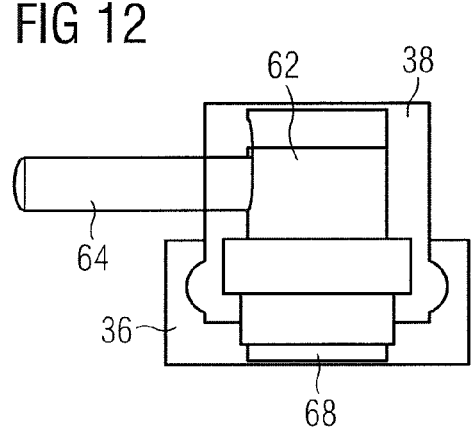
Figure 13:
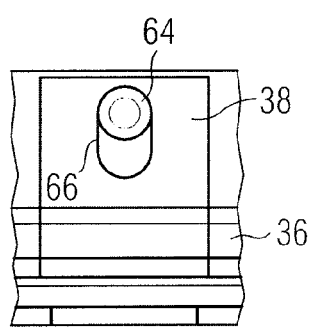
Figure 14A:
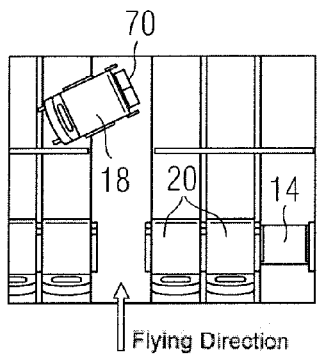
Figure 15A:
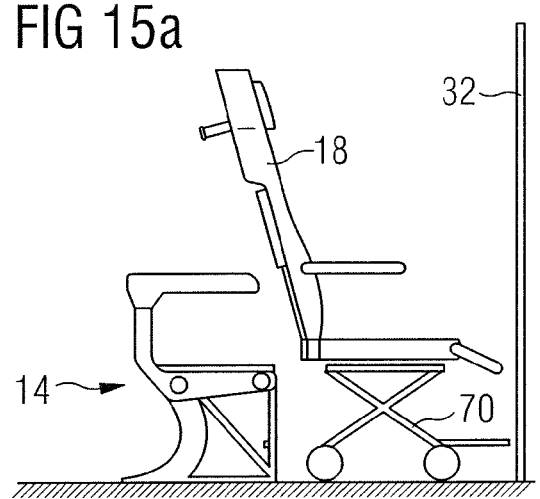
Figure 15B:
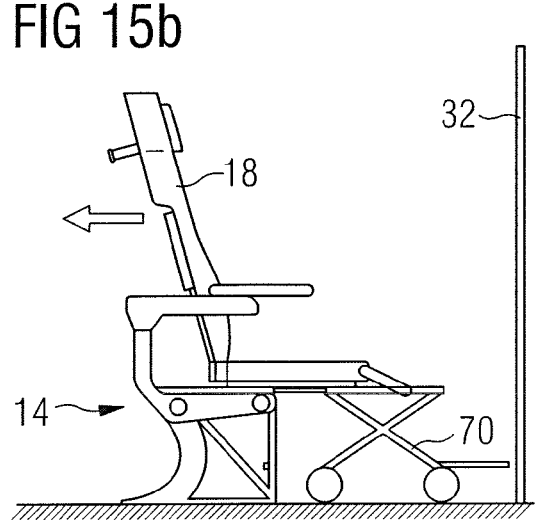
Figure 16:
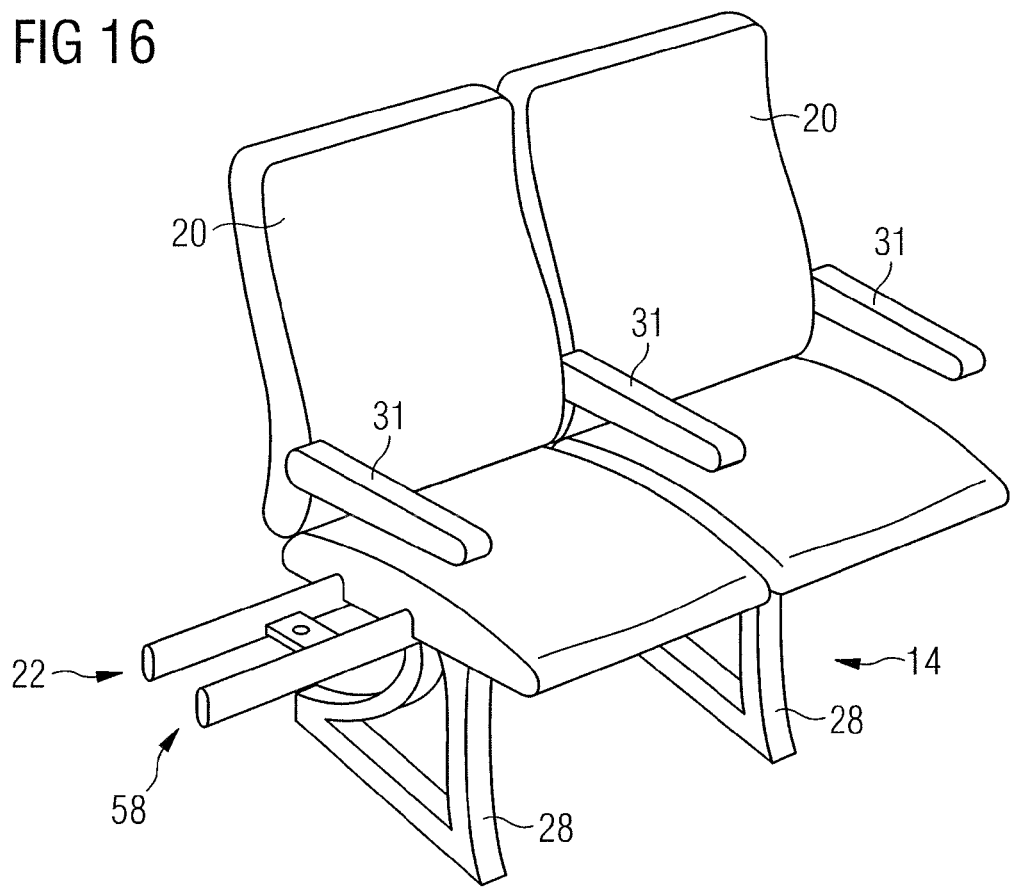
Figure 17:
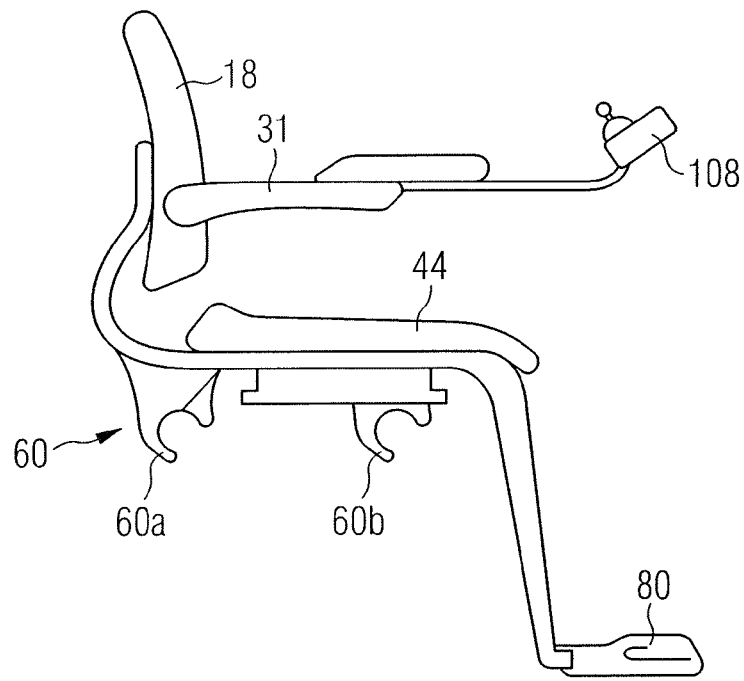
Figure 18:
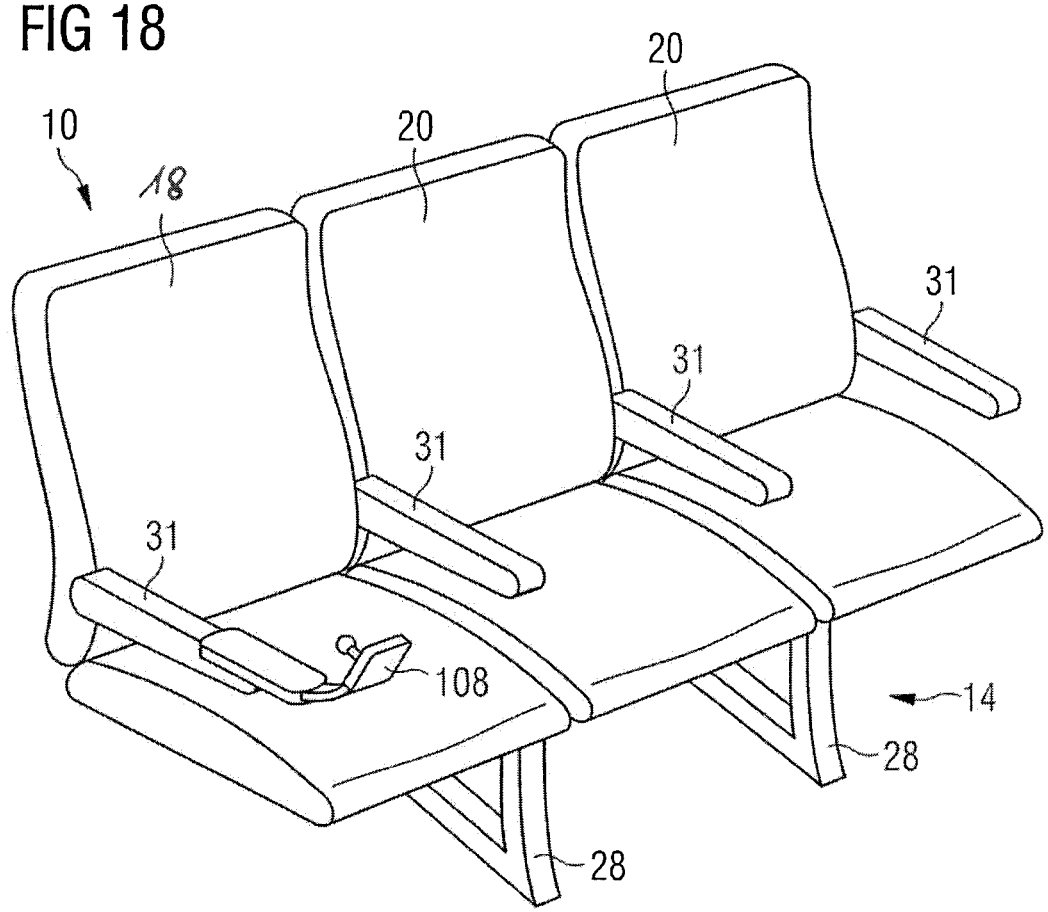
Figure 19:
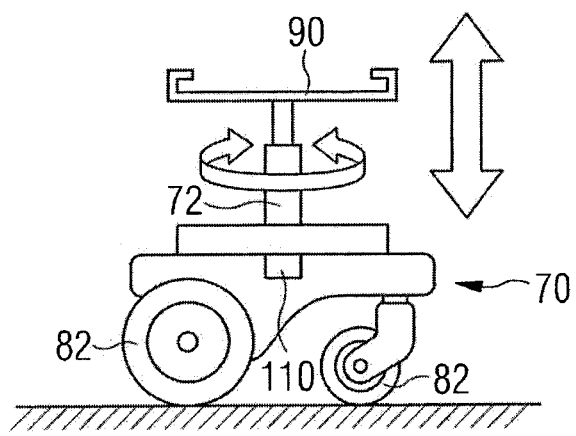
Figure 20:
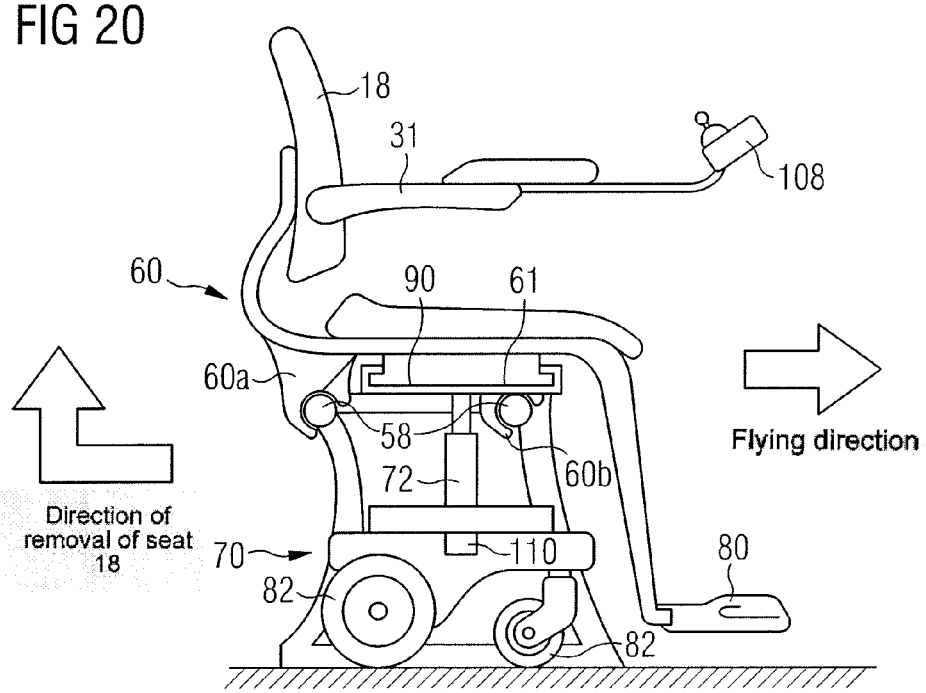
Figure 21:
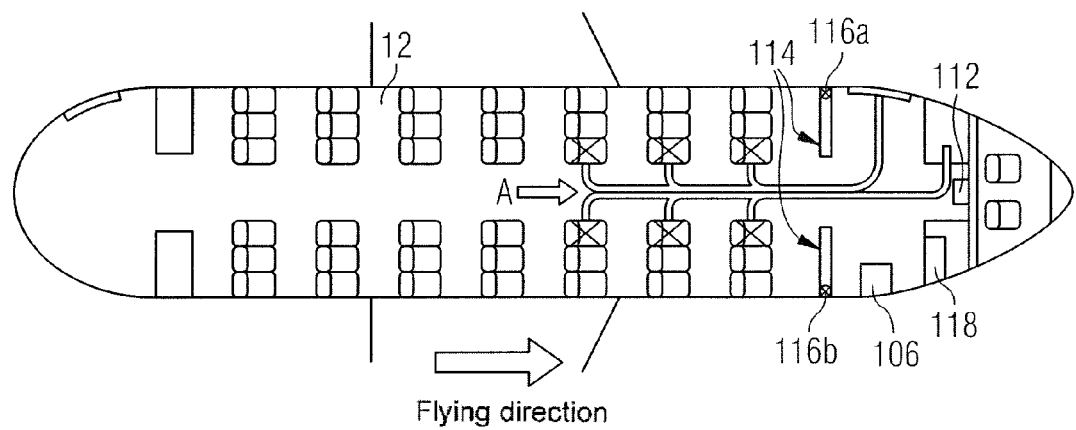

There now follows a detailed description of preferred embodiments of the invention with reference to the accompanying diagrammatic drawings, which show in:

FIG. 1 a diagrammatic view of an aircraft cabin, in which a possible position of a seat for a passenger having restricted mobility is represented, FIG. 2 a three-dimensional representation of a portion of an aircraft cabin with an aircraft seat assembly comprising a seat base assembly, a wheelchair sub-frame and a seat, the seat of the aircraft seat assembly being positioned on the wheelchair sub-frame, FIG. 3 a three-dimensional representation of the seat and the wheelchair sub-frame, FIG. 4 a three-dimensional representation of the wheelchair sub-frame, FIG. 5 a three-dimensional representation of the seat base assembly, FIG. 6 a detail representation of the seat base assembly according to FIG. 5, FIG. 7 an aircraft seat row with a seat base assembly and a seat positioned on the seat base assembly of the aircraft seat assembly according to FIG. 2 in a three-dimensional rear view (left) and a three-dimensional front view (right), FIG. 8 a detail representation of the seat positioned on the seat base assembly of the aircraft seat assembly according to FIG. 7, FIG. 9 a rear view of the seat positioned on the seat base assembly according to FIG. 8, FIG. 10 a detail view of a fastening system and a guide system of the aircraft seat assembly, FIG. 11 a locking element of a locking device of a fastening means of the seat as well as a receiving device of a first fastening means of the seat base assembly or of a second fastening means of the wheelchair sub-frame, the locking element being situated in an unlocking position, FIG. 12 the arrangement according to FIG. 11, the locking element however being situated in its locking position, FIG. 13 a side view of the arrangement represented in FIGS. 11 and 12, FIGS. 14a) to i) in plan view the steps needed to reposition the seat of the aircraft seat assembly from the wheelchair sub-frame onto the seat base assembly, FIGS. 15a) to c) in side view the repositioning of the seat of the aircraft seat assembly from the wheelchair sub-frame onto the seat base assembly, FIG. 16 a seat base assembly of a further embodiment of an aircraft seat assembly, FIG. 17 a seat provided for fastening to the seat base assembly according to FIG. 16, FIG. 18 the seat base assembly according to FIG. 16, on which the seat according to FIG. 17 is fastened, FIG. 19 a wheelchair sub-frame, on which the seat according to FIG. 17 can be fastened, FIG. 20 the wheelchair sub-frame according to FIG. 19, on which the seat according to FIG. 17 is fastened, and FIG. 21 an aircraft cabin, in which the seat base assembly according to FIGS. 16 to 20 is usable.

An aircraft seat assembly 10 for aircraft passengers with restricted mobility that is represented in the figures comprises a seat base assembly 14 that is mountable in an aircraft cabin 12. As may best be seen in FIGS. 2 and 5 to 7, the seat base assembly 14 is part of an aircraft seat bench 16 that is provided for carrying two further conventional aircraft passenger seats 20 in addition to the seat 18 of the aircraft seat assembly 10.

The seat base assembly 14 comprises a first carrier device 22 configured in the form of a plate, which in the mounted state of the seat base assembly 14 in the aircraft cabin 12 extends substantially parallel to a floor 24 of the aircraft cabin 12. The first carrier device 22 forms a supporting surface for the seat 18 of the aircraft seat assembly 10. In a similar fashion carrier devices 26 of the aircraft seat bench 16, which are likewise of a plate-shaped configuration and in the mounted state of the aircraft seat bench 16 in the aircraft cabin 12 likewise extend parallel to the floor 24 of the aircraft cabin 12, form supporting surfaces for the conventional aircraft passenger seats 20. The first carrier device 22 of the seat base assembly 14 and the carrier device 26 of the aircraft seat bench 16 are supported by pedestals 28. The pedestals 28 are fastened in position in the aircraft cabin 12 with the aid of mounting rails 30 provided in the floor 24 of the aircraft cabin 12. As may best be seen in FIGS. 2 and 7 to 9, the aircraft seat bench 16 and hence the seat base assembly 14 are provided with armrests 31. The armrests 31 are pivotable between a folded-down position shown in the figures and a folded-up position and provide a lateral delimitation of the seat 18 disposed on the seat base assembly 14 and of the seats 20 disposed on the carrier devices 26 of the aircraft seat bench 16.

As is evident from FIG. 1, the aircraft seat bench 16 with the seat base assembly 14 is disposed in a first seat row in a fuselage-side part of the aircraft passenger cabin 12. The first seat row, while being positioned adjacent to a partition 32 (see FIG. 2), is however at a distance from the partition 32 that is greater than the distance between successively disposed seat rows. The seat row comprising the seat base assembly 14 is consequently easier to access than seat rows positioned further back in the aircraft cabin 12.

The seat base assembly 14 is provided with a first guide device 34, which in turn comprises two rail elements 36 each configured in the form of receiving rails. The rail elements 36 are fastened to an upper side of the first carrier device 22 of the seat base assembly 14 remote from the floor 24 of the aircraft cabin 12 and extend substantially parallel to one another along side edges of the first carrier device 22. The rail elements 36 of the seat base assembly 14 that are configured in the form of receiving rails are devised to interact with complementary rail elements 38 of a guide device 40 of the seat 18 that is complementary to the first guide device 34 of the seat base assembly 14. As may best be seen in FIG. 10, the rail elements 38, which extend substantially parallel to one another from an underside 42 of a seating surface 44 substantially along side edges of the seating surface underside 42, are shaped and dimensioned in such a way that they may be received displaceably in the rail elements 36 configured in the form of receiving rails of the seat base assembly 14. As a result of the interaction of the first guide device 34 of the seat base assembly 14 with the complementary guide device 40 of the seat 18 the seat 18 may be displaced in a guided manner relative to the first carrier device 22 of the seat base assembly 14 in a direction parallel to the first carrier device 22 of the seat base assembly 14 and/or substantially at right angles to a backrest 48 of the seat 18.

A rear surface, i.e. a surface disposed in the region of the seat backrest 48, of the rails elements 38 provided on the seat 18 serves as a stop element, which is provided for coming into abutment with a complementary stop element 50 of the seat base assembly 14 when the seat 18 has reached a desired position on the seat base assembly 14. As may best be seen in FIGS. 5 and 6, the stop elements 50 of the seat base assembly 14 are integrated in each case into the rail elements 36 of the first guide device 34, i.e. they form a rear delimitation of the rail elements 36. The interaction of the stop elements formed on the seat 18 with the stop elements 50 of the seat base assembly 14 reliably prevents the seat 18 during its positioning on the seat base assembly 14 from being pushed too far in the direction of a rear edge 52 of the first carrier device 22.

Integrated into the seat 18 of the aircraft seat assembly 10 is an electronic entertainment system, which comprises a monitor 54 represented in FIG. 9 and disposed in the region of a rear side of the seat backrest 48. It is self-evident that the electronic entertainment system is only an optional equipment feature of the seat 18. In order to supply power to the electronic entertainment system, the electronic entertainment system at least once the seat 18 has been positioned on the seat base assembly 14 has to be connected to the electrical supply system of the aircraft cabin 12. For this purpose the rear surface, which forms the stop element of the seat 18, of the rail elements 38 mounted on the seat 18 is provided with a touch-sensitive contact element. In a similar fashion a surface of the stop elements 50 of the seat base assembly 14 that comes into abutment with the surface of the rail elements 38 that forms the stop element of the seat 18 once the seat 18 is in a desired position on the seat base assembly 14 is provided with a touch-sensitive contact element 56. As a result of the interaction of the contact elements of the seat 18 with the contact elements 56 of the seat base assembly 14 the electronic entertainment system integrated into the seat 18 is automatically connected to the electrical supply system of the aircraft cabin 12 when the seat 18 is in its final position on the seat base assembly 14.

For fastening the seat 18 detachably to the seat base assembly 14 the seat base assembly 14 is provided with a first fastening means 58. The first fastening means 58 of the seat base assembly 14 is provided for interacting with a complementary fastening means 60 of the seat 18. As may best be seen in FIGS. 10 to 13, the fastening means 60 of the seat 18 comprises a locking device, which comprises two bolt-shaped locking elements 62 that are movable between a locking position and an unlocking position. The locking elements 62 are received in each case in one of the rail elements 38 of the seat 18 and are spring-loaded into their locking position shown in FIG. 12. By means of a lever 64 the locking elements 62 are movable manually into their unlocking position shown in FIG. 11. In order to enable a movement of the lever 64, the rail elements 38 adjacent to the locking element 62 are provided with an oblong hole 66 (see in particular FIG. 13), through which the lever 64 projects and is therefore easily accessible to a user. Where desired or necessary, components of the seat 18 and/or of the seat base assembly 14 that are situated in the region of the lever 64 may likewise be provided with apertures configured in the form of oblong holes, through which the lever 64 may project.

The first fastening means 58 of the seat base assembly 14 that interacts with the fastening means 60 of the seat 18 comprises a receiving device, which is formed by two recesses 68 formed in each case in the two rail elements 36 of the seat base assembly 14. The recesses 68 are shaped and dimensioned in such a way that they are each capable of receiving a locking element 62 of the fastening means 60 of the seat 18 once the locking element 62 is in its locking position (see FIG. 12).

The aircraft seat assembly 10 further comprises a wheelchair sub-frame 70. Instead of on the seat base assembly 14 the seat 18 may alternatively be positioned on the wheelchair sub-frame 70, as is shown in particular in FIGS. 2 and 3. The wheelchair sub-frame 70 with the seat 18 mounted thereon may be used to take a wheelchair-dependent aircraft passenger to a desired location both in the airport and in the aircraft.

The wheelchair sub-frame 70, which may best be seen in FIG. 4, comprises a second carrier device 72, which comprises two framework elements 74 disposed substantially parallel to one another. The framework elements 74 are formed in each case by two intersecting struts 76 and are connected to one another by two connecting struts 78. In order to enable the wheelchair sub-frame 70 to be stowed in a space-saving manner for example in an overhead luggage compartment in the aircraft cabin 12, the second carrier device 72 is of a collapsible construction. For this purpose there are provided in the region of the points of intersection of the struts 76 joints, which are not represented in detail in the figures and with the aid of which the framework elements 74 are collapsible in such a way that the struts 76 are disposed substantially parallel to one another. In order to achieve an even more compact configuration of the wheelchair sub-frame 70, the connecting struts 78 may also be uncoupled from the struts 76 of the framework elements 74. A footrest 80 is coupled to the struts 76 of the framework elements 74 so as to be pivotable about one of the connecting struts 78. The wheelchair sub-frame 70 further comprises four wheels 82, which are each rotatable about a wheel axis R and about an axis A perpendicular to the wheel axis R. The wheelchair sub-frame 70 is therefore particularly easy to manoeuvre in various directions.

The wheelchair sub-frame 70 comprises a second guide device 84, which is supported by the framework elements 74 of the second carrier device 72 and which, like the first guide device 34 of the seat base assembly 14, comprises two rail elements 86 configured in the form of receiving rails and extending parallel to one another. The second guide device 84 of the wheelchair sub-frame 70 is of the same construction as the first guide device 34 of the seat base assembly 14, so that the rail elements 38 provided on the seat 18 may be received displaceably in the rail elements 86 of the second guide device 84 of the wheelchair sub-frame 70 in the same manner as described above in connection with the first guide device 34 of the seat base assembly 14.

In order to limit a displacement of the seat 18 relative to the wheelchair sub-frame 70, a surface, which is disposed in the region of a front edge of the seating surface 44 of the seat remote from the seat backrest 48, of the rail elements 38 provided on the seat serves in each case as a stop element, which is provided for coming into abutment with a corresponding complementary stop element 88 of the wheelchair sub-frame 70 once the seat 18 has reached a desired position on the wheelchair sub-frame 70. The stop elements 88 of the wheelchair sub-frame 70, like the stops 50 of the seat base assembly 14, form a delimitation of the rail elements 86 but are not, like the stop elements 50 of the seat base assembly 14, provided with a touch-sensitive contact element. Furthermore, in the state of connection of the wheelchair sub-frame 70 to the seat 18 the stop elements 88 are not disposed in the region of the backrest 48 of the seat 18 but are situated in the region of a front edge of the seating surface 44 remote from the seat backrest 48. Thus, whereas the stop elements 50 of the seat base assembly 14 are capable of limiting a displacement of the seat 18, backrest 48 first, relative to the seat base assembly 14, the stop elements 88 of the wheelchair sub-frame 70 are used to limit a displacement of the seat 18, a front edge of the sitting surface 44 remote from the seat backrest 48 first, relative to the wheelchair sub-frame 70.

The wheelchair sub-frame 70 is further provided with a second fastening means 90. The second fastening means 90 of the wheelchair sub-frame 70 is of the same construction as the first fastening means 58 of the seat base assembly 14, i.e. the second fastening means 90, like the first fastening means 58, comprises a receiving device formed by two recesses 92. The locking elements 62 of the fastening means 60 of the seat 18, which are spring-loaded into their locking position, may be received in the recesses 92 of the receiving device once the locking elements 62 are situated in their locking position. As a result of the interaction of the recesses 92 formed in the rail elements 86 with the locking elements 62 the seat 18 may be fastened detachably to the wheelchair sub-frame 70, wherein the connection between the wheelchair sub-frame 70 and the seat 18, like the connection between the seat base assembly 14 and the seat 18, may be released by actuation of the levers 64 and guided displacement of the seat 18 relative to the wheelchair sub-frame 70.

As may best be seen in FIGS. 8 and 9, the seat 18 is equipped with aircraft seat upholstery, which corresponds in its shape and its colour to the aircraft seat upholstery of the conventional aircraft seats 20. The seat further comprises armrests 94 that are pivotable between a folded-up position (see FIGS. 8 and 9) and a folded-down position (see FIGS. 2 and 3). The armrests 94 of the seat 18 may be used by a wheelchair-dependent aircraft passenger as arm supports once the seat 18 has been mounted on the wheelchair sub-frame 70. If however the seat 18 has been fastened to the seat base assembly 14, the armrests 94 may be either folded up or deposited in their folded-down position on the armrests 31 of the seat base assembly 14. All that matters is that the armrests 94 of the seat 18 and the armrests 31 of the seat base assembly 14 do not interact in an obstructive manner with one another.

In order to increase the safety of the wheelchair-dependent aircraft passenger, the seat 18 further comprises a four-point seat belt 96. For the sake of greater clarity the safety belt 96 is represented only in FIGS. 3 and 8. A folding table 98 is moreover mounted on the rear side of the seat backrest 48. Finally, extending from the rear side of the seat backrest 48 are two handles 100 which, when the seat 18 is disposed on the wheelchair sub-frame 70, serve as pushing handles. Finally, the seat 18 is provided with two lateral leg supports 102, which in the region of the front edge of the seating surface 44 remote from the seat backrest 48 extend down at an angle from the seating surface 44.

Figure 14B:
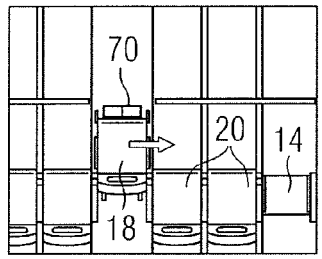
Figure 14C:
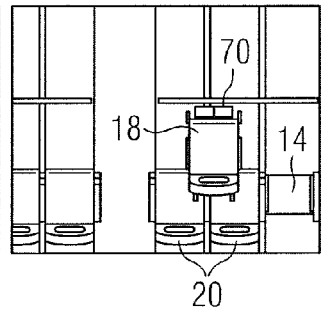
Figure 14D:
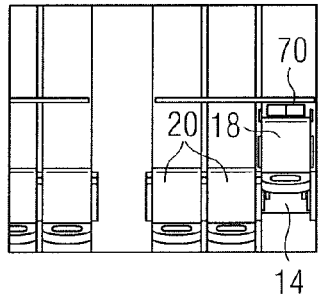
Figure 14E:
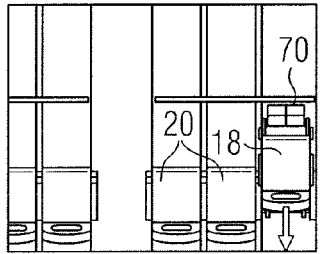

FIGS. 14a to 14i and 15a to 15c reveal the steps needed to place a wheelchair-dependent aircraft passenger on his seat by means of the aircraft seat assembly 10. First the passenger is brought into the aircraft, i.e. into the aircraft cabin 12, sitting on the seat 18 of the aircraft seat assembly 10 that is fastened to the wheelchair sub-frame 70. In a meaningful manner embarkation is through a fuselage-side door, see FIG. 14a. Then the wheelchair sub-frame 70 with the passenger sitting on the seat 18 is pulled backwards through the aisle of the aircraft cabin 12 until the position shown in FIG. 14b is reached. The wheelchair sub-frame 70 with the seat 18 and the passenger sitting thereon is then pushed sideways between the partition 32 and the seats 20 of the first aircraft seat row until the wheelchair sub-frame 70 with the seat 18 fastened thereon is disposed directly in front of the seat base assembly 14, see FIGS. 14d and 15a.

Then, by unlocking the locking element 62 of the fastening means 60 of the seat 18 the fastening of the seat 18 to the wheelchair sub-frame 70 is released so that the seat 18 as a result of the interaction of the guide device 40 of the seat 18 and the second guide device 84 of the wheelchair sub-frame 70 may be pushed in a guided manner off the wheelchair sub-frame 70. During this process the guide device 40 of the seat comes immediately into engagement with the first guide device 34 of the seat base assembly 14 so that the seat 18 may be pushed from the wheelchair sub-frame 70 directly onto the first carrier device 22 of the seat base assembly 14, see FIGS. 14e and 15b. The wheelchair-dependent aircraft passenger may remain seated in the seat 18 throughout.

Figure 14F:
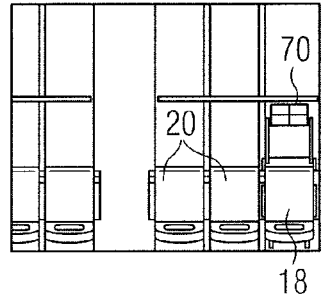
Figure 14G:
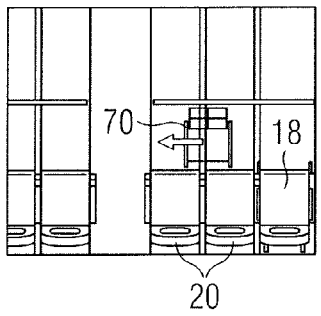
Figure 14H:
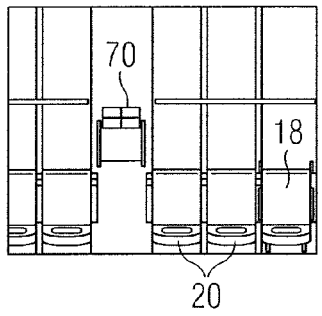
Figure 14I:
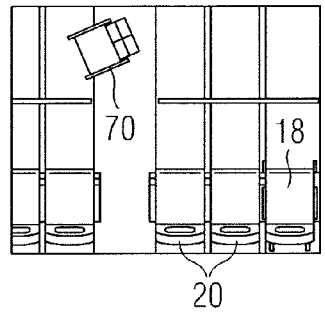
Figure 15C:
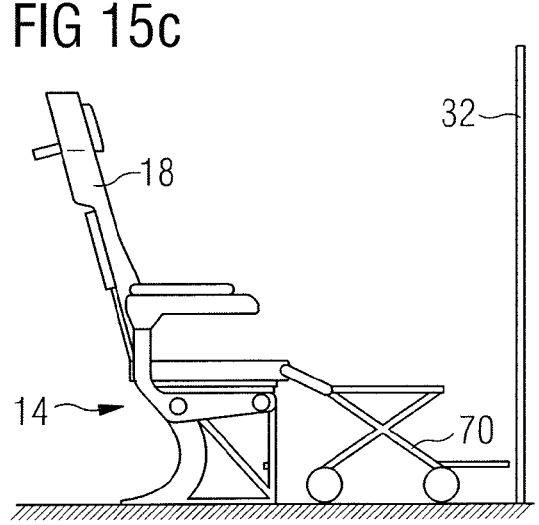

The seat 18 is displaced relative to the seat base assembly 14 until the rear surfaces serving as stop elements of the rail elements 38 provided on the seat come into abutment with the stop elements 50 of the seat base assembly 14. As soon as the seat 18 has reached this position, the locking elements 62 of the fastening means 60 of the seat 18 latch as a result of their spring loading automatically in the recesses 68 of the first fastening means 58 of the seat base assembly 14. Furthermore, as a result of the interaction of the contact elements 56 provided on the rear surfaces of the rail elements 38 of the seat 18 and on the stop elements 50 an electrical connection is established between the electronic entertainment system integrated into the seat 18 and the electrical supply system of the aircraft. Once the seat 18, as shown in FIGS. 14f and 15c, has reached its final position on the seat base assembly 14 and has been fastened on the seat base assembly 14, the wheelchair sub-frame 70, as shown in FIGS. 14g to i, may be pushed initially back into the aisle of the aircraft cabin 12 and taken from there to any desired location in the aircraft cabin 12. Where desired, the wheelchair sub-frame 70 may be collapsed and stowed for example in an overhead luggage compartment.

Disembarkation of the wheelchair-dependent aircraft passenger from the aircraft entails the previously described steps in reverse order, i.e. the seat 18 of the aircraft seat assembly 10 has to be detached from its position on the seat base assembly 14 and fastened on the wheelchair sub-frame 70. Release of the fastening between the seat base assembly 14 and the seat 18 and producing the fastening between the wheelchair sub-frame 70 and the seat 18 is effected in a corresponding manner.

An aircraft seat assembly 10 represented in FIGS. 16 to 20 differs from the system according to FIGS. 1 to 15 firstly in the configuration of the seat base assembly 14. In particular, the seat base assembly 14 of the aircraft seat assembly 10 according to FIGS. 16 to 20 comprises a carrier device 22 having two carrier struts, which are disposed substantially parallel to one another and extend substantially at right angles to the longitudinal axis of the aircraft cabin. The two carrier struts form the first fastening means 58 of the seat base assembly 14. The seat 18 represented in FIG. 17 comprises a fastening means 60 of a two-part construction, wherein a first part of the fastening means 60 of the seat 18 is provided for interacting with the fastening means 58, comprising the two carrier struts, of the seat base assembly 14. The first part of the fastening means 60 of the seat 18 comprises two bearing elements 60a, 60b, which engage each around one of the two carrier struts once the seat 18, as represented in FIG. 18, has been fastened on the seat base assembly 14.

The wheelchair sub-frame 70 of the aircraft seat assembly 10 that is shown in FIG. 19 comprises a second carrier device 72 configured in the form of a support column. The second carrier device 72 supports a second fastening means 90 of the wheelchair sub-frame 70 that is configured in the form of a rotatable adapter plate mounted on the second carrier device 72. A second part of the fastening means 60 of the seat 18 is accordingly provided for interacting with the rotatable adapter plate forming the second fastening means 90 of the wheelchair sub-frame 70. The second part of the fastening means 60 of the seat 18 is configured in the form of a retaining plate 61, around which the adapter plate may engage.

The second carrier device 72 of the wheelchair sub-frame 70 comprises a lifting mechanism for adjusting the height of the second carrier device 72. The seat base assembly 14 and the wheelchair sub-frame 70 are moreover designed in such a way that the wheelchair sub-frame 70 may be positioned under the first carrier device 22 of the seat base assembly 14, so that the wheelchair sub-frame 70 may be positioned under the first carrier device 22 of the seat base assembly 14 that carries the seat 18 (see FIG. 20). In order to fasten the seat 18 fastened on the seat base assembly 14 to the wheelchair sub-frame 70, the second carrier device 72 may be lifted by means of the lifting mechanism until the second fastening means 90 of the wheelchair sub-frame 70 comes into engagement with the fastening means 60 of the seat 18. As a result of further lifting of the second carrier device 72 with the seat 18 fastened on the carrier device 72, the first fastening means 58 of the seat base assembly 14 and the first part of the fastening means 60 of the seat 18 move out of engagement, so that the seat 18 is detached from the seat base assembly 14.

The aircraft seat assembly 10 is further equipped with an electronic system 106 for controlling the wheelchair sub-frame 70. The control system 106 comprises an operator control unit 108, which is connected to the seat 18 of the aircraft seat assembly 10 and disposed in the region of an armrest of the seat 18 so as to be easily accessible to a passenger with restricted mobility who is sitting on the seat. The system 106 further comprises a drive unit 110 of the wheelchair sub-frame 70 that is controllable by means of corresponding signals of the operator control unit 108. Between the operator control unit 108 and the drive unit 110 of the wheelchair sub-frame 70 there is a wireless data transmission link.

A passenger with restricted mobility may control the movement of the wheelchair sub-frame 70 through the cabin 12 in a desired manner by means of the operator control unit 108. Once the seat 18 of the aircraft seat assembly 10 has been fastened on the wheelchair sub-frame 70 and the passenger is sitting on the seat 18, the aircraft seat assembly 10 may therefore be operated like an electric wheelchair by the passenger. What is more, when the seat 18 of the aircraft seat assembly 10 is fastened on the seat base assembly 14, the passenger may request the wheelchair sub-frame 70 by remote control.

The system 106 for controlling the wheelchair sub-frame 70 is devised, during control of the drive unit 110 of the wheelchair sub-frame 70 by means of the operator control unit 108 connected to the seat 18, additionally to take account of an enabling signal as well as a control signal of an aircraft communications system 112. In particular, the system 106 for controlling the wheelchair sub-frame 70 allows an activation of the drive unit 110 of the wheelchair sub-frame 70 by means of the operator control unit 108 only if a corresponding enabling of this function of the aircraft seat assembly 10 has been effected. The enabling may be effected for example by means of manual signal input by the cabin crew or by means of an automatically generated signal of the aircraft communications system 112. Furthermore, permitted routes A that the wheelchair sub-frame 70 may travel in the aircraft cabin 12 (see FIG. 21) are stored in a memory of the aircraft communications system. Finally, the control functions of the system 106 for controlling the wheelchair sub-frame 70 are subject to temporary restrictions dependent on the flying operational state of the aircraft, i.e. for example movement of the wheelchair sub-frame 70 through the aircraft cabin 12 is suspended during take-off, landing, serving times and in the event of turbulence.

The system 106 for controlling the wheelchair sub-frame 70 further comprises a location system 114 for determining the position of the wheelchair sub-frame 70 in the aircraft cabin 12. The location system comprises an ultrasonic location system comprising two ultrasonic sensors 116a, 116b disposed in the aircraft cabin 12. In addition or alternatively thereto the location system 114 may be provided with an optical bar-code recognition system comprising corresponding pictographs provided in the under-floor area of the cabin. Finally, the wheelchair sub-frame 70 comprises a differential with a rotation sensor (not shown in the figures), which during a rotation of the wheels is at rest and therefore measures only the route actually travelled by the wheelchair sub-frame 70. The differential may further determine an angular deflection of the wheels 82 from any different rotational speed of the individual wheels 82 of the wheelchair sub-frame 70.

The system 106 for controlling the wheelchair sub-frame 70 further comprises a system for detecting obstacles, which is not shown in detail in the figures. The obstacle detection system comprises a resistance meter positioned in a wheel hub of the wheelchair sub-frame 70. The control system 106 is devised to stop the movement of the wheelchair sub-frame 70 in real time if the wheelchair sub-frame 70 encounters an obstacle as it is moving through the aircraft cabin 12. The control system 106 is further devised to resume the travel of the wheelchair sub-frame 70 after a predetermined interval of for example several seconds. If the obstacle is then still there, the control system 106 emits a corresponding signal and alerts the cabin crew via the aircraft communications system 112.

The wheelchair sub-frame 70 is further equipped with a device for emitting an audible and/or visual warning signal, which device is likewise not shown in the figures. The warning signal may be emitted for example whenever the wheelchair sub-frame 70 is moving through the aircraft cabin 12.

The aircraft seat assembly 10 further comprises a charging station 118, which is devised to be connected to the wheelchair sub-frame 70 in order to charge an energy storage unit of the wheelchair sub-frame 70 while the wheelchair sub-frame 70 is not in use. The energy storage unit of the wheelchair sub-frame 70 supplies the drive unit 110 of the wheelchair sub-frame 70 with energy. When the wheelchair sub-frame 70 is connected to the charging station 118, the wheelchair sub-frame 70 is secured in position.

The invention claimed is:

1. A method of transferring a passenger in a wheelchair to a seating area of an aircraft, comprising:
    moving a wheelchair sub-frame having subframe rail elements and a seat having seat rail elements slidingly engageable with the wheelchair sub-frame rail elements along an aisle in a longitudinal direction of the aircraft;
    moving the wheelchair sub-frame and seat within a space provided in front of a seating row in a direction perpendicular to the longitudinal direction, the seating row comprising a seat base assembly adapted to receive the seat of the wheelchair sub-frame wherein the seat faces in the longitudinal direction in a forward direction of the aircraft while moving within said space by rolling the wheelchair sub-frame and seat on wheels of the wheelchair sub-frame laterally;
    moving the wheelchair sub-frame and seat within said space past a seat of the seating row comprising the seat base assembly, provided adjacent to the aisle until the wheelchair sub-frame and seat are positioned in front of the seat base assembly provided to the row;

sliding the seat in a backward direction opposite the flight direction of the aircraft such that seat base rail elements provided to the seat base assembly are engaged with the seat rail elements of the seat, wherein the subframe rail elements of the wheelchair subframe and the seat base rail elements of the seat base assembly extend above the floor of the aircraft at substantially the same height such that the seat remains substantially at the same height above the floor prior to and after sliding the seat from the wheelchair sub-frame to sliding engagement with the seat base assembly.

2. The method of claim 1, wherein the seat base assembly takes the place of a window seat of the aircraft.

* * * * *